United States Patent
Lyon et al.

(10) Patent No.: US 11,169,719 B2
(45) Date of Patent: Nov. 9, 2021

(54) SYSTEM AND METHOD FOR DEPLOYING MULTI-NODE VIRTUAL STORAGE APPLIANCES

(71) Applicant: EMC IP Holding Company, LLC, Hopkinton, MA (US)

(72) Inventors: Jared C. Lyon, Brighton, MA (US); Wai C. Yim, Merrimack, NH (US); Susan R. Young, Needham, MA (US); Michael L. Burriss, Raleigh, NC (US); Derek Michael Scott, Raleigh, NC (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/529,292

(22) Filed: Aug. 1, 2019

(65) Prior Publication Data
US 2021/0034260 A1    Feb. 4, 2021

(51) Int. Cl.
*G06F 3/06* (2006.01)
*G06F 9/455* (2018.01)

(52) U.S. Cl.
CPC .......... *G06F 3/0629* (2013.01); *G06F 3/0604* (2013.01); *G06F 3/067* (2013.01); *G06F 9/45558* (2013.01); *G06F 2009/45583* (2013.01)

(58) Field of Classification Search
CPC .... G06F 3/0629; G06F 3/0604; G06F 3/0607; G06F 3/067; G06F 3/0631; G06F 3/0632; G06F 3/0683; G06F 3/0685; G06F 9/45558; G06F 2009/45583
See application file for complete search history.

(56) References Cited

U.S. PATENT DOCUMENTS

| | | | |
|---|---|---|---|
| 9,396,004 B1* | 7/2016 | Bester | G06F 9/45533 |
| 9,424,058 B1* | 8/2016 | Wasson | G06F 9/45558 |
| 10,379,894 B1* | 8/2019 | Cruz Oliveira Queiros | H04L 63/10 |
| 2009/0210873 A1* | 8/2009 | Cuomo | G06F 9/45558 718/1 |
| 2010/0235831 A1* | 9/2010 | Dittmer | G06F 9/45558 718/1 |
| 2011/0154331 A1* | 6/2011 | Ciano | G06F 9/45558 718/1 |
| 2012/0246645 A1* | 9/2012 | Iikura | G06F 8/61 718/1 |
| 2017/0075709 A1* | 3/2017 | Feng | H04L 67/22 |
| 2017/0228246 A1* | 8/2017 | Kotha | G06F 9/45558 |
| 2019/0332275 A1* | 10/2019 | Jin | G06F 11/2092 |

* cited by examiner

*Primary Examiner* — Michael Krofcheck
(74) *Attorney, Agent, or Firm* — Brian J. Colendreo; Mark H. Whittenberger; Holland & Knight LLP

(57) ABSTRACT

A method, computer program product, and computing system for generating, via a computing device, a virtual storage appliance template file. The virtual storage appliance template file may be duplicated to generate a plurality of virtual storage appliance configuration files. A plurality of virtual storage appliance nodes may be deployed, via a hypervisor, with the plurality of virtual storage appliance node configuration files. Each of the plurality of virtual storage appliance node configuration files may be configured for a respective virtual storage appliance node of the plurality of virtual storage appliance nodes.

19 Claims, 5 Drawing Sheets

SYSTEM AND METHOD FOR DEPLOYING MULTI-NODE VIRTUAL STORAGE APPLIANCES

TECHNICAL FIELD

This disclosure relates to deploying virtualized storage systems and, more particularly, to deploying multi-node virtualized storage systems.

BACKGROUND

Storing and safeguarding electronic content is of paramount importance in modern business. Accordingly, various methodologies may be employed to protect and distribute such electronic content. For example, high-availability, virtualized storage systems may be utilized to provide users with access to virtual machines (and associated storage) that may be custom tailored to the needs and desires of the user. Unfortunately when deploying multi-node virtualized storage systems; configurations may be inadvertently changed that may results in a loss of communication between virtualized systems.

SUMMARY OF DISCLOSURE

In one implementation, a computer-implemented method is executed on a computing system and includes generating a virtual storage appliance template file. The virtual storage appliance template file may be duplicated to generate a plurality of virtual storage appliance configuration files. A plurality of virtual storage appliance nodes may be deployed, via a hypervisor, with the plurality of virtual storage appliance node configuration files. Each of the plurality of virtual storage appliance node configuration files may be configured for a respective virtual storage appliance node of the plurality of virtual storage appliance nodes.

One or more of the following features may be included. Generating the virtual storage appliance template file may include receiving one or more parameters of the virtual storage appliance template file and the one or more parameters may include at least one of one or more storage configuration parameters for the virtual storage appliance; one or more network configuration parameters for the virtual storage appliance; and one or more host configuration parameters for the virtual storage appliance. The one or more parameters of the virtual storage appliance template file may be validated. One or more network switches may be generated. The configured plurality of virtual storage appliance nodes may be connected to the one or more network switches. The configured plurality of virtual storage appliance nodes may be connected to one or more storage devices. The plurality of virtual storage appliance nodes may each be deployed as a separate virtual machine.

In another implementation, a computer program product resides on a computer readable medium and has a plurality of instructions stored on it. When executed by a processor, the instructions cause the processor to perform operations including generating a virtual storage appliance template file. The virtual storage appliance template file may be duplicated to generate a plurality of virtual storage appliance configuration files. A plurality of virtual storage appliance nodes may be deployed, via a hypervisor, with the plurality of virtual storage appliance node configuration files. Each of the plurality of virtual storage appliance node configuration files may be configured for a respective virtual storage appliance node of the plurality of virtual storage appliance nodes.

One or more of the following features may be included. Generating the virtual storage appliance template file may include receiving one or more parameters of the virtual storage appliance template file and the one or more parameters may include at least one of one or more storage configuration parameters for the virtual storage appliance; one or more network configuration parameters for the virtual storage appliance; and one or more host configuration parameters for the virtual storage appliance. The one or more parameters of the virtual storage appliance template file may be validated. One or more network switches may be generated. The configured plurality of virtual storage appliance nodes may be connected to the one or more network switches. The configured plurality of virtual storage appliance nodes may be connected to one or more storage devices. The plurality of virtual storage appliance nodes may each be deployed as a separate virtual machine.

In another implementation, a computing system includes a processor and a memory system configured to perform operations including generating a virtual storage appliance template file. The virtual storage appliance template file may be duplicated to generate a plurality of virtual storage appliance configuration files. A plurality of virtual storage appliance nodes may be deployed, via a hypervisor, with the plurality of virtual storage appliance node configuration files. Each of the plurality of virtual storage appliance node configuration files may be configured for a respective virtual storage appliance node of the plurality of virtual storage appliance nodes.

One or more of the following features may be included. Generating the virtual storage appliance template file may include receiving one or more parameters of the virtual storage appliance template file and the one or more parameters may include at least one of one or more storage configuration parameters for the virtual storage appliance; one or more network configuration parameters for the virtual storage appliance; and one or more host configuration parameters for the virtual storage appliance. The one or more parameters of the virtual storage appliance template file may be validated. One or more network switches may be generated. The configured plurality of virtual storage appliance nodes may be connected to the one or more network switches. The configured plurality of virtual storage appliance nodes may be connected to one or more storage devices. The plurality of virtual storage appliance nodes may each be deployed as a separate virtual machine.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
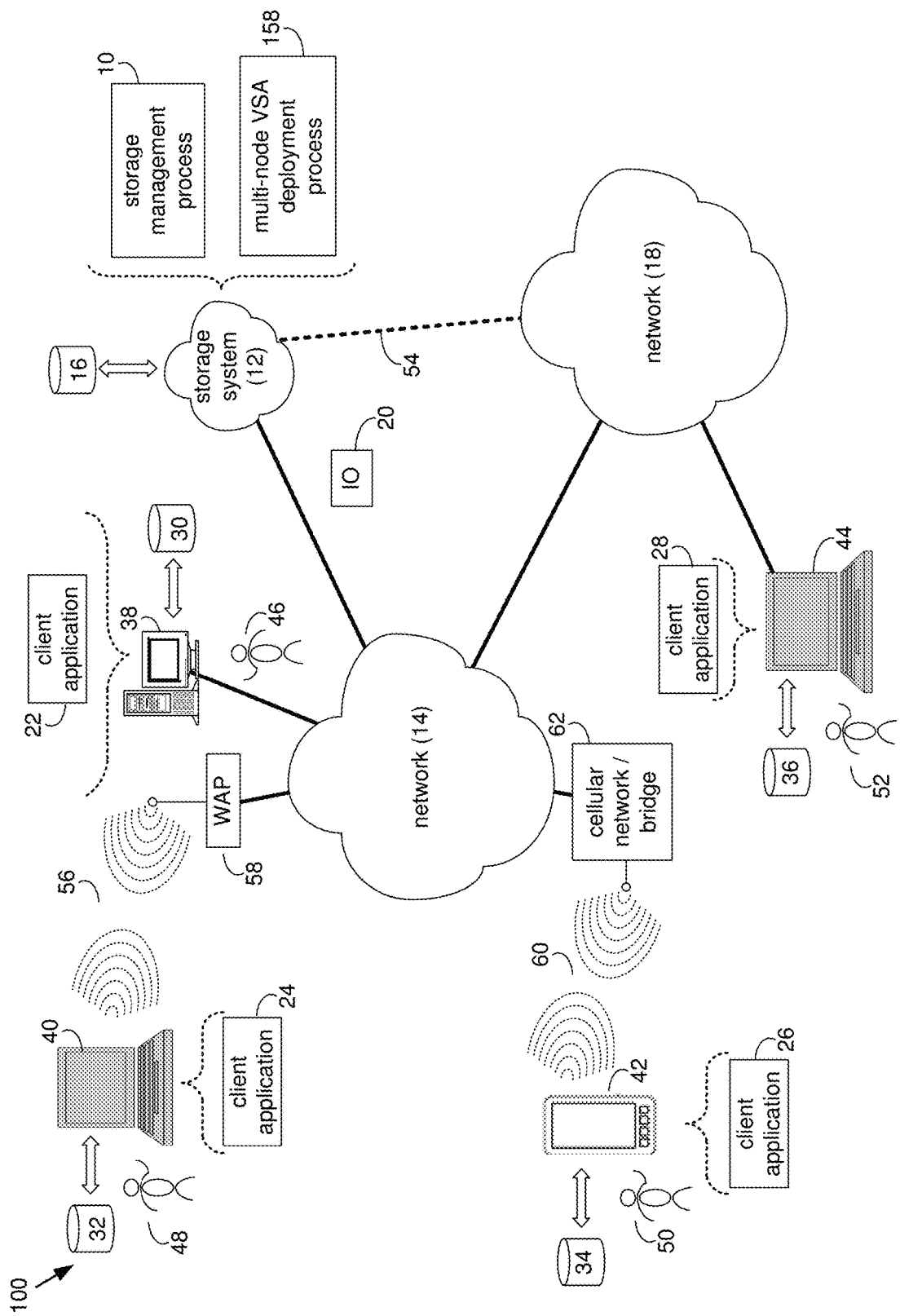
FIG. 1 is a diagrammatic view of a storage system, a multi-node virtual storage appliance (VSA) deployment process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
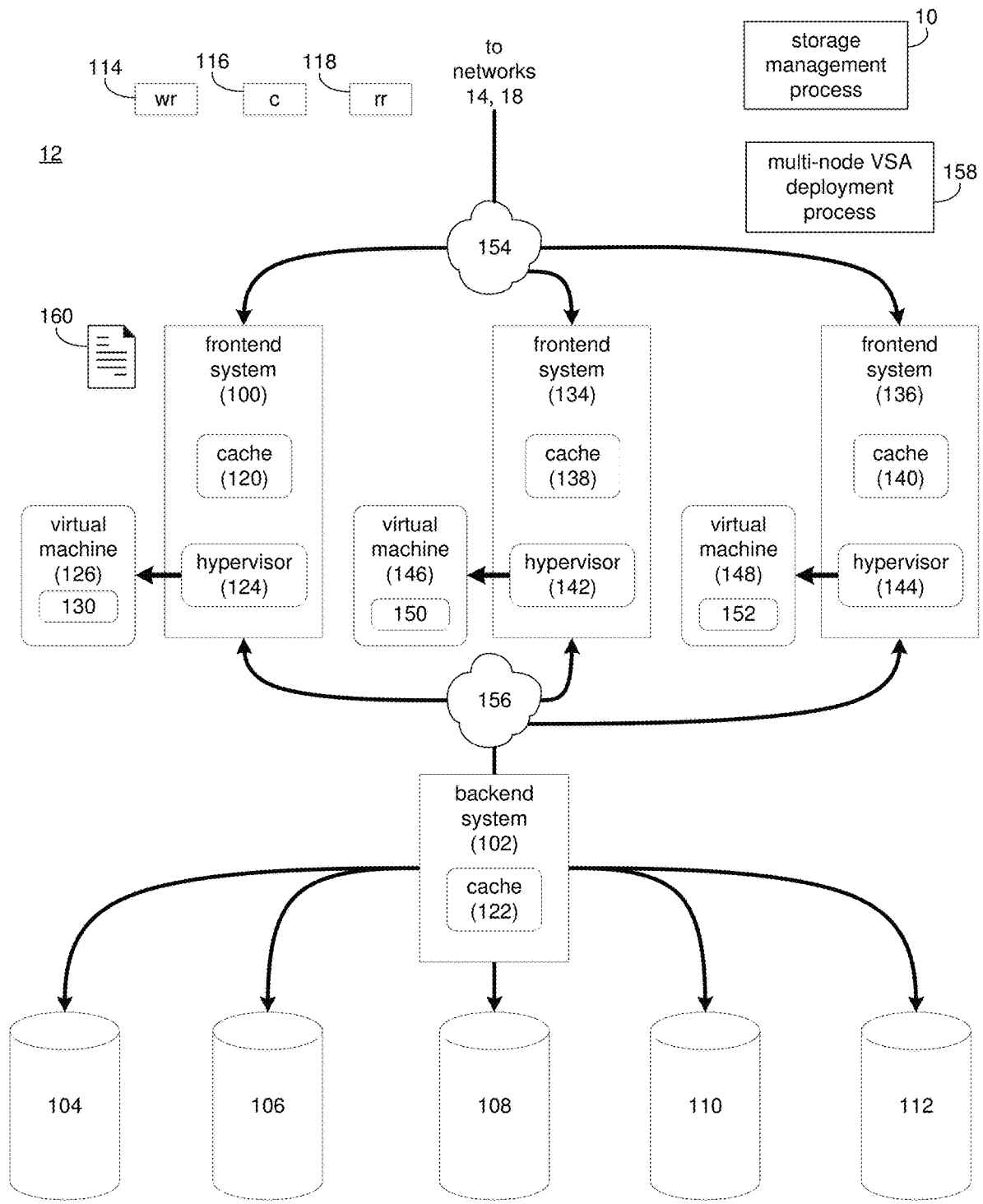
FIG. 2 is a diagrammatic view of the storage system of FIG. 1 according to one or more embodiments of the present disclosure.
Figure 3:
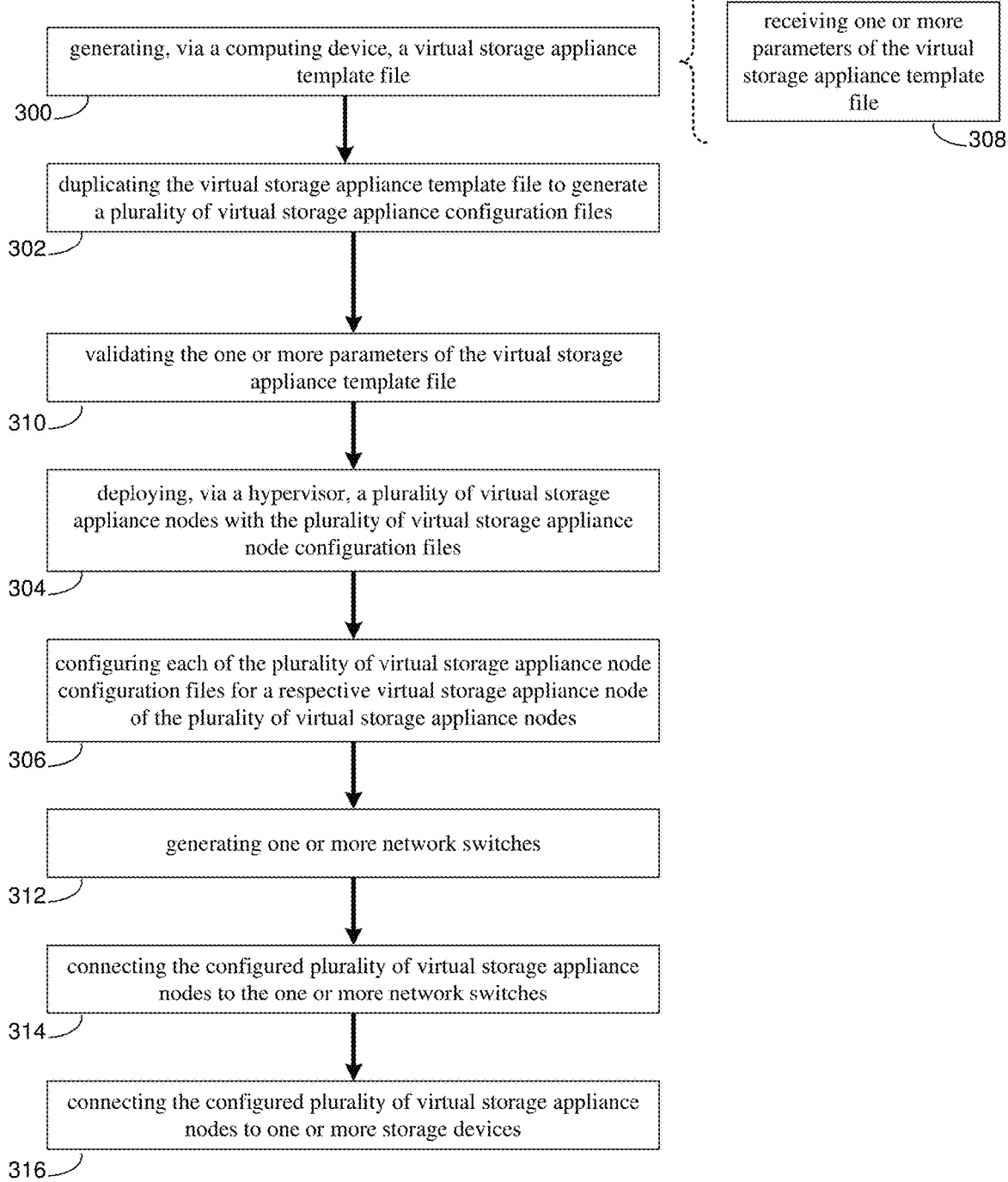
FIG. 3 is a flow chart of the multi-node VSA deployment process of FIG. 1 according to one or more embodiments of the present disclosure.

Storage System:

Referring also to FIG. 2, there is shown a general and illustrative implementation of storage system 12 (or a portion thereof). In this general and illustrative implementation, data storage system 12 may include frontend system 100, backend system 102 and a plurality of storage targets (e.g. storage targets 104, 106, 108, 110, 112). Storage targets 104, 106, 108, 110, 112 may be configured to provide various levels of performance and/or high availability. For example, one or more of storage targets 104, 106, 108, 110, 112 may be configured as a RAID 0 array, in which data is striped across storage targets. By striping data across a plurality of storage targets, improved performance may be realized. However, RAID 0 arrays do not provide a level of high availability. Accordingly, one or more of storage targets 104, 106, 108, 110, 112 may be configured as a RAID 1 array, in which data is mirrored between storage targets. By mirroring data between storage targets, a level of high availability is achieved as multiple copies of the data are stored within storage system 12.

While storage targets 104, 106, 108, 110, 112 are discussed above as being configured in a RAID 0 or RAID 1 array, this is for illustrative purposes only and is not intended to be a limitation of this disclosure, as other configurations are possible. For example, storage targets 104, 106, 108, 110, 112 may be configured as a RAID 3, RAID 4, RAID 5, RAID 6 or RAID 7 array. Additionally, storage targets 104, 106, 108, 110, 112 need not be limited to any type of RAID systems, as other configurations are possible and are considered to be within the scope of this disclosure. For example, storage targets 104, 106, 108, 110, 112 may be configured as e.g., scale-out SANs (such as VMWare vSAN™ and Dell EMC Scale IO™).

While in this particular example, storage system 12 is shown to include five storage targets (e.g. storage targets 104, 106, 108, 110, 112), this is for illustrative purposes only and is not intended to be a limitation of this disclosure. Specifically, the actual number of storage targets may be increased or decreased depending upon e.g. the level of redundancy/performance/capacity required.

One or more of storage targets 104, 106, 108, 110, 112 may be configured to store coded data, wherein such coded data may allow for the regeneration of data lost/corrupted on one or more of storage targets 104, 106, 108, 110, 112. Examples of such coded data may include but is not limited to parity data and Reed-Solomon data. Such coded data may be distributed across all of storage targets 104, 106, 108, 110, 112 or may be stored within a specific storage device. Examples of storage targets 104, 106, 108, 110, 112 may include one or more electro-mechanical hard disk drives and/or solid-state/flash devices.

Storage system 12 may execute all or a portion of storage management process 10. The instruction sets and subroutines of storage management process 10, which may be stored on a storage device (e.g., storage device 16) coupled to frontend system 100 and/or backend system 102, may be executed by one or more processors (not shown) and one or more memory architectures (not shown) included within frontend system 100 and/or backend system 102. Storage device 16 may include but is not limited to: a hard disk drive; a RAID device; random access memory (RAM); read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 114 (i.e. a request that content 116 be written to storage system 12) and data read request 118 (i.e. a request that content 116 be read from storage system 12).

During operation of frontend system 100, content 116 to be written to storage system 12 may be processed by frontend system 100. Additionally/alternatively and when frontend system 100 is configured as an application server, content 116 to be written to storage system 12 may be internally generated by frontend system 100.

Frontend system 100 may include frontend cache memory system 120. Examples of frontend cache memory system 120 may include but are not limited to a volatile, solid-state, cache memory system (e.g., a dynamic RAM cache memory system) and/or a non-volatile, solid-state, cache memory system (e.g., a flash-based, cache memory system).

Frontend system 100 may initially store content 116 within frontend cache memory system 120. Depending upon the manner in which frontend cache memory system 120 is configured, frontend system 100 may immediately provide content 116 to backend system 102 (if frontend cache memory system 120 is configured as a write-through cache) or may subsequently provide content 116 to backend system 102 (if frontend cache memory system 120 is configured as a write-back cache).

Backend system 102 may include backend cache memory system 122. Examples of backend cache memory system 122 may include but are not limited to a volatile, solid-state, cache memory system (e.g., a dynamic RAM cache memory system) and/or a non-volatile, solid-state, cache memory system (e.g., a flash-based, cache memory system). During operation of backend system 102, content 116 to be written to storage targets 104, 106, 108, 110, 112 may be received from frontend system 100. Backend system 112 may initially store content 116 within backend cache memory system 122 prior to being stored on e.g. one or more of storage targets 104, 106, 108, 110, 112.

Frontend system 100 may include and/or execute a hypervisor (e.g., hypervisor 124) that may allow for the execution of one or more virtual machines (e.g., virtual machine 126). As is known in the art, a hypervisor (e.g., hypervisor 124) is a piece of computer software, firmware and/or hardware that creates and runs virtual machines (e.g., virtual machine 126), wherein the hypervisor (e.g., hypervisor 124) may present and manage a guest operating system on a virtual operating platform. Therefore, multiple instantiations of a variety of operating systems may be effectuated on shared hardware resources. For example, Linux™, Windows™, and Mac™ operating system instantiations may all run on a single physical x86 system.

Accordingly, virtual machine 126 may be an emulation of a physical computer system. For example, virtual machine 126 may be configured to provide the functionality of a Windows™ based computing system and may allow for the execution of Windows-based application 130, while another virtual machine may be configured to provide the functionality of a Linux™ based computing system and may allow for the execution of a Linux-based application. While hypervisor 124 is shown with one virtual machine (e.g., virtual machine 126), it will be appreciated that hypervisor 124 may create and run any number of virtual machines within the scope of the present disclosure.

Frontend system 100 and/or backend system 102 may include one or more physical hardware components (not shown) that may be configurable by hypervisor 124 to form virtual machines (e.g., virtual machines 126). Examples of these physical hardware components may include but are not limited to: hard drives (e.g., storage targets 104, 106, 108, 110, 112), RAID arrays (e.g., formed by storage targets 104, 106, 108, 110, 112), host bus adapters, network controllers, network systems and components, processor cores, cache memory architectures (e.g., frontend cache memory system 120 and/or backend cache memory system 122), volatile memory architectures, and persistent memory architectures. Accordingly and when virtual machine 126 is executed on hypervisor 124, various portions of these physical hardware components may be assigned to/mapped to virtual machine 126.

In order to provide a higher-level of availability and/or a higher level of performance, storage system 12 may include one or more additional frontend systems (e.g., frontend systems 134, 136) that may be configured in a manner similar to frontend system 100. Therefore, frontend systems 134, 136 may each include a frontend cache system (e.g., frontend cache 138, 140) and may include and/or execute a hypervisor (e.g., hypervisor 142, 144) that may allow for the execution of one or more virtual machines (e.g., virtual machines 146, 148), which may run applications (e.g., applications 150, 152). While an example with three frontend systems has been described above, it will be appreciated that any number of frontend systems may be used within the scope of the present disclosure.

The various components of storage system 12 may be interconnected with (and may communicate through) one or more communication networks (e.g., networks 154, 156).

Multi-Node Virtual Storage Appliance (VSA) Deployment Process:

As will be discussed below in greater detail, multi-node VSA deployment process 158 may be configured to allow for the automated deployment of multiple virtual storage appliance (VSA) nodes within storage system 12. The instruction sets and subroutines of multi-node VSA deployment process 158, which may be stored on a storage device (e.g., storage device 16) coupled to frontend system 100, frontend system 134, frontend system 136, and/or backend system 102, may be executed by one or more processors (not shown) and one or more memory architectures (not shown) included within frontend system 100, frontend system 134, frontend system 136, and/or backend system 102.

Referring also to FIGS. 2-5 and in some embodiments, multi-node VSA deployment process 158 may include generating 300, via a computing device, a virtual storage appliance template file. The virtual storage appliance template file may be duplicated 302 to generate a plurality of virtual storage appliance configuration files. A plurality of virtual storage appliance nodes may be deployed 304, via a hypervisor, with the plurality of virtual storage appliance node configuration files. Each of the plurality of virtual storage appliance node configuration files may be configured 306 for a respective virtual storage appliance node of the plurality of virtual storage appliance nodes.

In some embodiments, a user (e.g., user 46) may desire to configure a multi-nodal virtual storage appliance. However, configuring multiple nodes may lead to inconsistencies. For example, with so many manual steps and some "non-standard" configuration operations, it is easily foreseeable that the multi-node virtual storage appliance configuration may be error prone and may cause the deployment on virtual machines to fail. As will be discussed in greater detail below, embodiments of the present disclosure may allow configuration information to be specified once, validated, and duplicated to multiple nodes for deploying a multi-node virtual storage appliance. In this manner, multi-node VSA deployment process 158 may generate the environment configuration and provide the automation for creating a virtual storage appliance within the hypervisor itself, including all of the roles for the virtual machines to act as separate virtual storage appliance nodes, all from a single virtual storage appliance template file that could work to deploy a single virtual machine.

In some embodiments, multi-node VSA deployment process 158 may generate 300 a virtual storage appliance template file. A virtual storage appliance template file (e.g., virtual storage appliance template file 160) may generally include a configuration file used for generating and deploying a virtual storage appliance. In some embodiments, generating the virtual storage appliance template file (e.g., virtual storage appliance template file 160) may include receiving 308 one or more parameters of the virtual storage appliance template file. In some embodiments, the one or more parameters may include at least one of one or more storage configuration parameters for the virtual storage appliance, one or more network configuration parameters for the virtual storage appliance, and one or more host configuration parameters for the virtual storage appliance.

For example and in some embodiments, storage configuration parameters may generally include configuration specifications for storage parameters (e.g., disk sizes, RAID configurations, number of disks, size of RAM that a virtual storage appliance will use, operating system requirements, etc.). For example, user 46 may provide, via application 22, the one or more storage configuration parameters that are used to generate virtual storage appliance template file 160. In some embodiments, multi-node VSA deployment process 158 may provide one or more default storage configurations that may be modified by a user. In some embodiments, network configuration parameters may generally include configuration settings for network parameters (e.g., the number of virtual network adapters, the network connection type (e.g., Bridged, NAT, Host-only or Custom), internal networks, external networks, the configuration of one or more virtual local area networks (VLANs), etc.). For example, user 46 may provide, via application 22, the one or more network configuration parameters that are used to generate virtual storage appliance template file 160. In some embodiments, multi-node VSA deployment process 158 may provide one or more default network configurations that may be modified by a user. In some embodiments, host configuration parameters may generally include configuration parameters that control the ability to configure hosts (e.g., frontend systems 100, 134, 136). Examples of host configuration parameters may generally include specifying a host or hosts to deploy the virtual storage system, firmware requirements, configuring hyperthreading in a host, network and/or storage settings specific to each host, etc. In some embodiments, user 46 may provide, via application 22, the one or more host configuration parameters that are used to generate virtual storage appliance template file 160. In some embodiments, multi-node VSA deployment process 158 may provide one or more default host configuration parameters that may be modified by a user. While three examples of virtual storage appliance parameters have been provided, it will be appreciated that other parameters may be received in the configuration of a virtual storage appliance within the scope of the present disclosure. For example and in some embodiments, multi-node VSA deployment process 158 may derive, from the hypervisor, information required to build or configure the virtual storage appliance configuration file so that a multi-node virtual storage appliance may be deployed. In this manner, multi-node VSA deployment process 158 may derive from the hypervisor the configurations required to deploy the multi-node virtual storage appliance.

In some embodiments, the virtual storage appliance template file may include a number of virtual storage appliance nodes. A virtual storage appliance (VSA) node may generally include a storage node that runs as a virtual machine instead of on purpose-built hardware. As will be discussed in greater detail below, virtual storage appliance nodes may be based upon the hardware/resources of a frontend system and may each be configured to access a common set of storage devices. For example, one or more logical storage devices (e.g., LUNs) may be formed from one or more physical storage and each virtual storage appliance node may work cooperatively (e.g., in an active-active or active-passive fashion) so that they each virtual storage appliance node may access these logical storage devices. In some embodiments, a user (e.g., user 46) may designate a number of virtual storage appliance nodes to configure in the virtual storage appliance template file (e.g., virtual storage appliance template file 160) using an application (e.g., application 22). In this manner and as will be discussed in greater detail below, a user may deploy a multi-node virtual storage appliance or virtual storage system.

In some embodiments, multi-node VSA deployment process 158 may include a user interface or tool configured to receive the one or more virtual storage appliance configuration parameters and/or number of virtual storage appliance nodes to generate a virtual storage appliance template file. In this manner, a user may provide the one or more virtual storage appliance configuration parameters and/or number of virtual storage appliance nodes to the user interface/tool of multi-node VSA deployment process 158 and multi-node VSA deployment process 158 may generate the virtual storage appliance template file.

In some embodiments, multi-node VSA deployment process 158 may validate 310 the one or more parameters of the virtual storage appliance template file. For example and in some embodiments, multi-node VSA deployment process 158 may compare the configuration parameters for the virtual storage appliance from the virtual storage appliance template file (e.g., virtual storage appliance template file 160) with one or more configuration rules (e.g., stored in a database (e.g., storage device 16)). In some embodiments, when multi-node VSA deployment process 158 is unable to validate 310 the one or more parameters (e.g., unavailable or insufficient resources, invalid configurations of resources, etc.), multi-node VSA deployment process 158 may generate a notification for a user indicating the invalid parameter(s). In some embodiments, multi-node VSA deployment process 158 may only continue with the deployment of the multi-node virtual storage appliance when all parameters are valid. In some embodiments, validating 310 the one or more parameters of the virtual storage appliance template file may include validating additional checks outside of the configuration parameters. For example, multi-node VSA deployment process 158 may determine whether there are enough system resources and appropriate licenses to deploy the virtual storage appliance. In some embodiments, validating 310 the one or more parameters of the virtual storage appliance template file may include configuration checks regardless of user-specified input parameters. However, it will be appreciated that any number of or type of parameters may be validated by multi-node VSA deployment process 158 within the scope of the present disclosure. For example and discussed above, multi-node VSA deployment process 158 may derive, from the hypervisor, information required to build or configure the virtual storage appliance configuration file so that a multi-node virtual storage appliance may be deployed.

Figure 4:
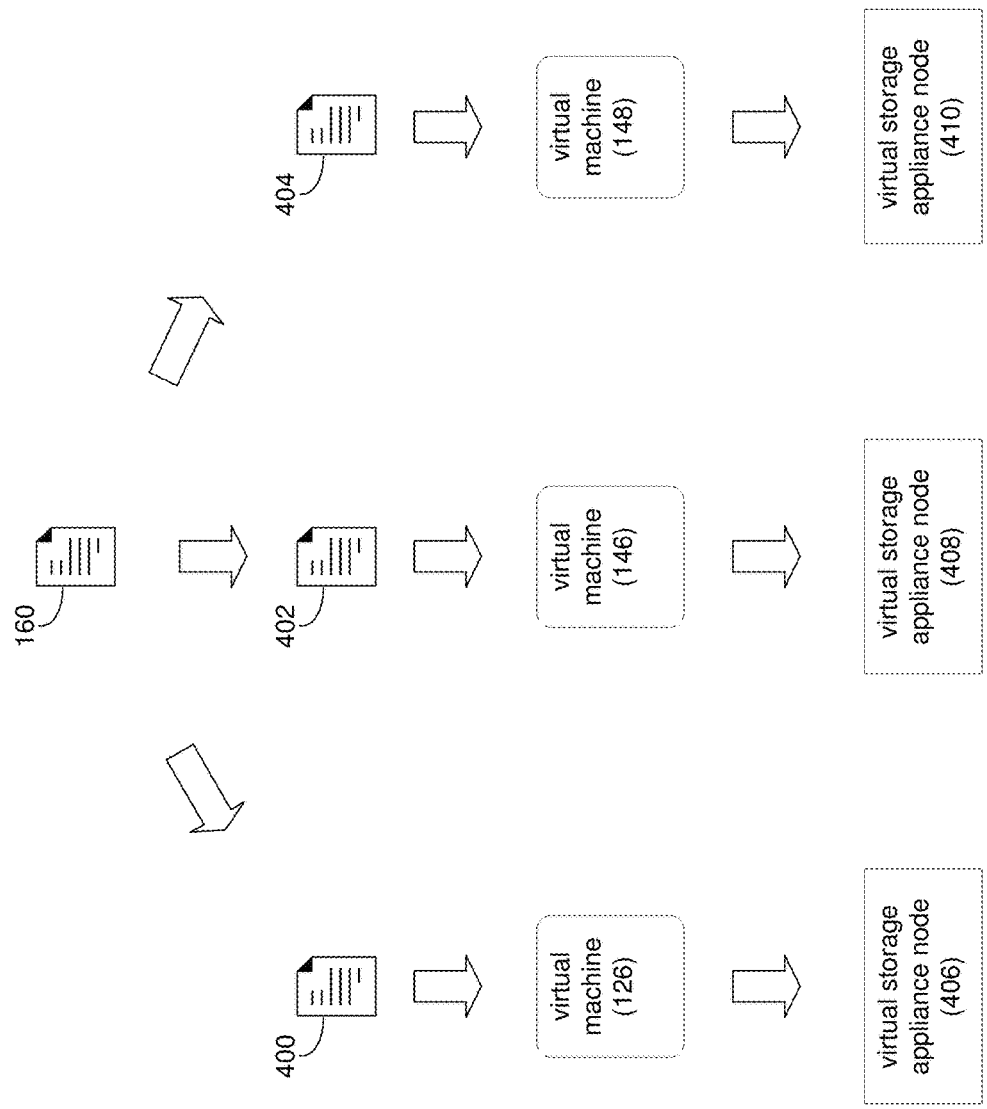
FIG. 4 is a diagrammatic view of the multi-node VSA deployment process of FIG. 1 according to one or more embodiments of the present disclosure.

In some embodiments, multi-node VSA deployment process 158 may duplicate 302 the virtual storage appliance template file to generate a plurality of virtual storage appliance configuration files. Referring also to the example of FIG. 4 and in some embodiments, a validated virtual storage appliance template file (e.g., virtual storage appliance template file 160) may be duplicated 302 based upon, at least in part, the number of virtual storage appliance nodes defined in the validated virtual storage appliance template file (e.g., virtual storage appliance template file 160). In one example, user 46 may specify the deployment of e.g., three virtual storage appliance nodes. In this example, multi-node VSA deployment process 158 may duplicate 302 virtual storage appliance template file 160 three times (e.g., once for each virtual storage appliance node to be deployed). As shown in FIG. 4, virtual storage appliance template file 160 may be duplicated (e.g., by multi-node VSA deployment process 158) into virtual storage appliance configuration files 400, 402, 404. In this manner, multi-node VSA deployment process 158 may prevent a user from manually and individually configuring and deploying a separate virtual storage appliance configuration file for each virtual storage appliance node. In some embodiments and as discussed above, multi-node VSA deployment process 158 may prevent duplication 302 of virtual storage appliance template file 160 until virtual storage appliance template file is validated (e.g., by multi-node VSA deployment process 158). While an example above has been provided of three virtual storage appliance nodes and three duplications of a virtual storage appliance template file, it will be appreciated that any number of virtual storage appliance nodes and number of duplicates of a virtual storage appliance template file may be used within the scope of the present disclosure.

In some embodiments, multi-node VSA deployment process 158 may deploy 304, via a hypervisor, a plurality of virtual storage appliance nodes with the plurality of virtual storage appliance node configuration files. In some embodiments, the plurality of virtual storage appliance nodes may each be deployed 304 as a separate virtual machine. Referring again to the example of FIG. 4 and in some embodiments, multi-node VSA deployment process 158 may deploy 304 a plurality of virtual storage appliance nodes (e.g., virtual storage appliance nodes 406, 408, 410) based upon, at least in part, virtual storage appliance node configuration files 400, 402, 404 (e.g., duplicates of virtual storage appliance template file 160). In the example of FIG. 4 and in some embodiments, each of the plurality of virtual storage appliance nodes (e.g., virtual storage appliance nodes 406, 408, 410) may be deployed 304 as a separate virtual machine (e.g., virtual machines 126, 146, 148).

Figure 5:
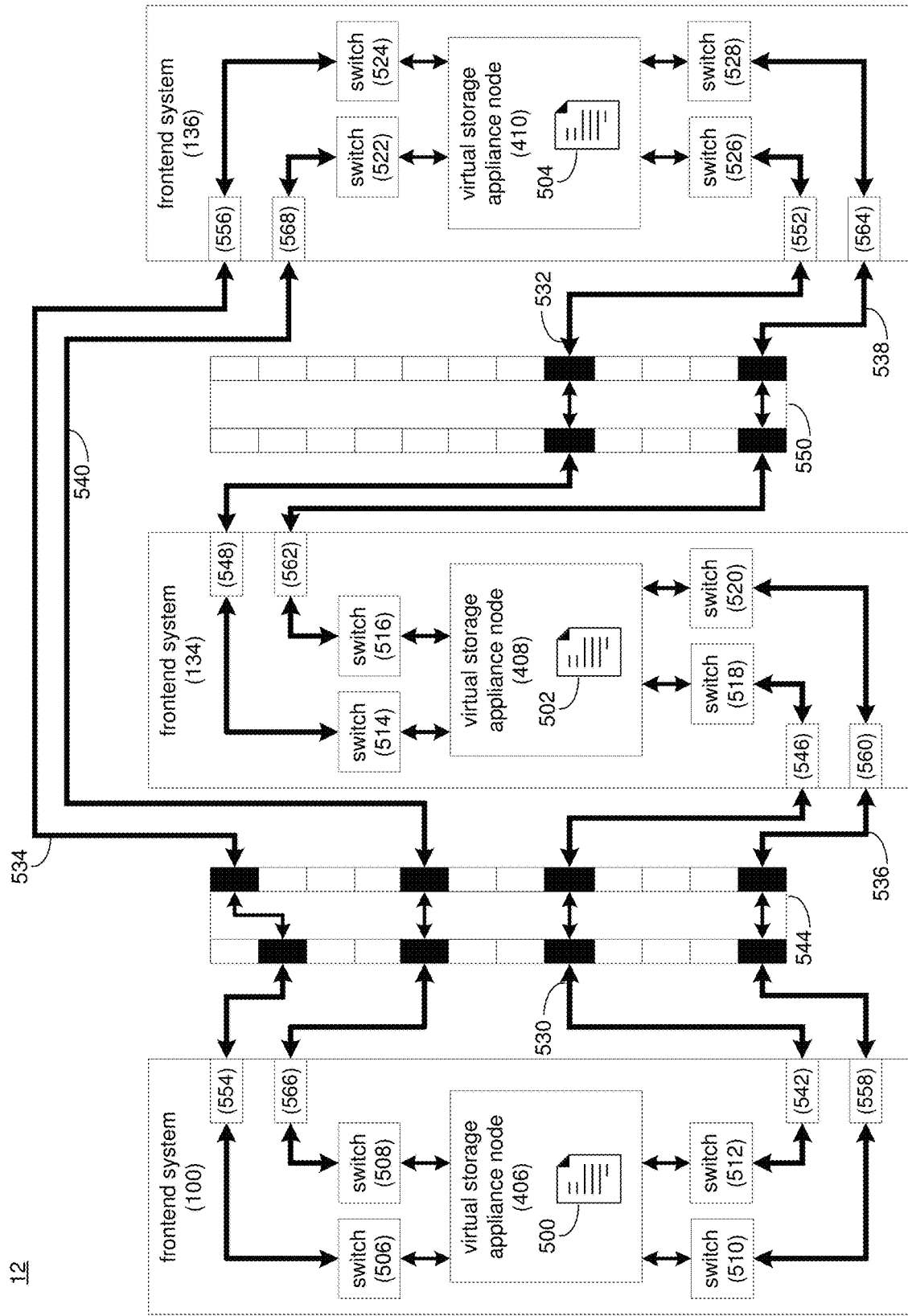
FIG. 5 is virtualized view of the storage system of FIG. 1 according to one or more embodiments of the present disclosure.

Referring also to FIG. 5, there is shown one example of the manner in which virtualized storage appliances may be deployed within storage system 12. As discussed above, the various hypervisors (e.g., hypervisors 124, 142, 144) may allow for the execution of virtual machines (e.g., virtual machine 126 via hypervisor 124, virtual machine 146 via hypervisor 142, and virtual machines 148 via hypervisor 144), wherein these virtual machines may allow for the execution of various applications (e.g., applications 130, 150, 152).

For example, a first virtual storage appliance node (e.g., virtual storage appliance node 406), a second virtual storage appliance node (e.g., virtual storage appliance node 408), and a third virtual storage appliance node (e.g., virtual storage appliance node 410) may be deployed within storage system 12 and may be generated based upon the physical hardware of storage system 12 (in the manner described above). In some embodiments and for high availability purposes, virtual storage appliance node 406 may be executed on frontend system 100, while virtual storage appliance node 408 may be executed on frontend system 134 and virtual storage appliance node 410 may be executed on frontend system 136, wherein the combination of virtual storage appliance node 406 and/or virtual storage appliance node 408 and/or virtual storage appliance node 410 may form a high-availability, multi-node virtual storage appliance or multi-node virtual storage appliance system.

In some embodiments, multi-node VSA deployment process 158 may configure 306 each of the plurality of virtual storage appliance node configuration files for a respective virtual storage appliance node of the plurality of virtual storage appliance nodes. Configuring 306 each of the plurality of virtual storage appliance node configuration files for a respective virtual storage appliance node may generally include assigning one or more roles to a virtual storage appliance node. In one example involving two virtual storage appliance nodes or a dual-node virtual storage appliance, the virtual storage appliance nodes may have the same roles (e.g., "active-active") or different roles (e.g., "active-passive"). In some embodiments, these roles may be assigned by updating each virtual storage appliance configuration file with a particular node identifier defining the roles for the virtual storage appliance node. For example, multi-node VSA deployment process 158 may configure 306 virtual storage appliance node configuration file 500 for virtual storage appliance node 406 by updating virtual storage appliance node configuration file 500 with a virtual storage appliance node identifier (e.g., "SPA") and virtual storage appliance node configuration file 502 for virtual storage appliance node 408 by updating virtual storage appliance node configuration file 502 with a virtual storage appliance node identifier (e.g., "SPB"). In this example, virtual storage appliance node 406 may be configured 306 (by multi-node VSA deployment process 158) to be an "active" virtual storage appliance node and virtual storage appliance node 408 may be configured 306 (by multi-node VSA deployment process 158) to be a "passive" virtual storage appliance node. While example virtual storage appliance node identifiers and roles have been discussed involving two virtual storage appliance nodes, it will be appreciated that any virtual storage appliance node identifier may be updated or provided in a virtual storage appliance node configuration file to define various roles involving any number of virtual storage appliance nodes. In some embodiments, the virtual storage appliance node identifier updated in the virtual storage appliance node configuration file may be used by the hypervisor to configure resources and/or connections of the virtual storage appliance node.

In another example, virtual storage appliance node configuration files 500, 502, 504 of virtual storage appliance nodes 406, 408, 410 may be configured 306 by multi-node VSA deployment process 158 to allow virtual storage appliance nodes 406, 408, 410 to each access storage targets 104, 106, 108, 110, 112. For example, one or more logical storage devices (e.g., LUNs) may be formed from the one or more physical storage devices (e.g., storage targets 104, 106, 108, 110, 112), wherein virtual storage appliance nodes 406, 408, 410 may work cooperatively (e.g., in an active-active or active-passive fashion) so that they both may access these logical storage devices.

In some embodiments and in order to enable virtual storage appliance nodes 406, 408, 410 to work cooperatively and coordinate access to the logical storage devices (e.g., LUNs) formed from storage targets 104, 106, 108, 110, 112, virtual storage appliance nodes 406, 408, 410 may communicate with each other to avoid a "split brain" situation, wherein at least two virtual storage appliance nodes write data to these logical storage devices without regard for what the other virtual storage appliance nodes are doing (which may result in data loss and/or data corruption).

In some embodiments, multi-node VSA deployment process 158 may generate 312 one or more network switches. Referring again to the example of FIG. 5 and to further enhance the level of high availability, virtual storage appliance nodes 406, 408, 410 may be coupled to (i.e., communicate with) each other using a plurality of different communication paths and one or more network switches (e.g., network switches 506, 508, 510, 512 for virtual storage appliance node 406 using hypervisor 124 of frontend system 100; network switches 514, 516, 518, 520 for virtual storage appliance node 408 using hypervisor 142 of frontend system 134; and network switches 522, 524, 526, 528 for virtual storage appliance node 410 using hypervisor 144 of frontend system 136. In some embodiments, generating the one or more network switches may include generating one or more private internal network switches. However, it will be appreciated that other network configurations are possible within the scope of the present disclosure. In some embodiments, multi-node VSA deployment process 158 may derive a required networking configuration from the hypervisor so the virtual machines can deploy and become a single virtual storage appliance with multiple virtual storage appliance nodes. In this manner, multi-node VSA deployment process 158 may adapt to the environment the virtual storage appliance is being deploying in to create the same multi-node virtual storage appliance in each environment.

In some embodiments, multi-node VSA deployment process 158 may connect 314 the configured plurality of virtual storage appliance nodes to the one or more private internal network switches. In some embodiments, multi-node VSA deployment process 158 may establish a data communication channel (e.g., data communication channel 530) between a first virtual storage appliance node (e.g., virtual storage appliance node 406) and a second virtual storage appliance node (e.g., virtual storage appliance node 408) within storage system 12, wherein data communication channel 530 may include a network-based data communication path. Multi-node VSA deployment process 158 may also establish a data communication channel (e.g., data communication channel 532) between the second virtual storage appliance node (e.g., virtual storage appliance node 408) and a third virtual storage appliance node (e.g., virtual storage appliance node 410) within storage system 12, wherein data communication channel 532 may include a network-based data communication path. In some embodiments, multi-node VSA deployment process 158 may establish a data communication channel (e.g., data communication channel 534) between the first virtual storage appliance node (e.g., virtual storage appliance node 406) and the third virtual storage appliance node (e.g., virtual storage appliance node 410) within storage system 12, wherein data communication channel 534 may include a network-based data communication path.

Multi-node VSA deployment process 158 may also establish a heartbeat communication channel (e.g., heartbeat communication channel 536) between the first virtual storage appliance (e.g., virtual storage appliance node 406) and the second virtual storage appliance (e.g., virtual storage appliance node 408) within storage system 12. Heartbeat communication channel 536 may include at least one network-based heartbeat communication path and/or at least one storage-based heartbeat communication path. Similarly, multi-node VSA deployment process 158 may establish a heartbeat communication channel (e.g., heartbeat communication channel 538) between the second virtual storage appliance (e.g., virtual storage appliance node 408) and the third virtual storage appliance (e.g., virtual storage appliance node 410) within storage system 12. Heartbeat communication channel 538 may include at least one network-based heartbeat communication path and/or at least one storage-based heartbeat communication path. In some embodiments, multi-node VSA deployment process 158 may further establish a heartbeat communication channel (e.g., heartbeat communication channel 540) between the first virtual storage appliance (e.g., virtual storage appliance node 406) and the third virtual storage appliance (e.g., virtual storage appliance node 410) within storage system 12. Heartbeat communication channel 550 may include at least one network-based heartbeat communication path and/or at least one storage-based heartbeat communication path.

In some embodiments, communication paths 530, 532, 534, 536, 538, 540 may all be network-based communication paths and may allow virtual storage appliance nodes 406, 408, 410 to communicate via one or more virtualized data communication networks, an example of which may include but is not limited to a virtualized IP communications network.

Additionally and in the interest of providing a high level of availability, each of communication paths 530, 532, 534, 536, 538, 540 may be coupled to virtual storage appliance nodes 406, 408, 410 using a virtualized connection that may be mapped to/upon separate and distinct underlying network hardware.

For example, communication path 530 may be mapped onto a private internal network switch (e.g., private internal network switch 512) and a network interface adapter (e.g., network interface adapter 542) within e.g., frontend system 100; a physical switch (e.g., physical switch 544); and a network interface adapter (e.g., network interface adapter 546) and a private internal network switch (e.g., private internal network switch 518) within e.g., frontend system 134. Similarly, communication path 532 may be mapped onto a private internal network switch (e.g., private internal network switch 514) and a network interface adapter (e.g., network interface adapter 548) within e.g., frontend system 134; a physical switch (e.g., physical switch 550); and a network interface adapter (e.g., network interface adapter 552) and a private internal network switch (e.g., private internal network switch 526) within e.g., frontend system 136. In some embodiments, communication path 534 may be mapped onto a private internal network switch (e.g., private internal network switch 506) and a network interface adapter (e.g., network interface adapter 554) within e.g., frontend system 100; a physical switch (e.g., physical switch 544); and a network interface adapter (e.g., network interface adapter 556) and a private internal network switch (e.g., private internal network switch 524) within e.g., frontend system 136.

Further, communication path 536 may be mapped onto a private internal network switch (e.g., private internal network switch 510) and a network interface adapter (e.g., network interface adapter 558) within e.g., frontend system 100; a physical switch (e.g., physical switch 544); and a network interface adapter (e.g., network interface adapter 560) and a private internal network switch (e.g., private internal network switch 520) within e.g., frontend system 134. Similarly, communication path 538 may be mapped onto a private internal network switch (e.g., private internal network switch 516) and a network interface adapter (e.g., network interface adapter 562) within e.g., frontend system 134; a physical switch (e.g., physical switch 550); and a network interface adapter (e.g., network interface adapter 564) and a private internal network switch (e.g., private internal network switch 528) within e.g., frontend system 136. In some embodiments, communication path 540 may be mapped onto a private internal network switch (e.g., private internal network switch 508) and a network interface adapter (e.g., network interface adapter 566) within e.g., frontend system 100; a physical switch (e.g., physical switch 544); and a network interface adapter (e.g., network interface adapter 568) and a private internal network switch (e.g., private internal network switch 524) within e.g., frontend system 136.

In some embodiments, communication path 530 may be configured to allow virtual storage appliance node 406 and virtual storage appliance node 408 to communicate by routinely transferring data/messages between virtual storage appliance node 406 and virtual storage appliance node 408. Similarly, communication path 532 may be configured to allow virtual storage appliance node 408 and virtual storage appliance node 410 to communicate by routinely transferring data/messages between virtual storage appliance node 408 and virtual storage appliance node 410 and communication path 534 may be configured to allow virtual storage appliance node 406 and virtual storage appliance node 410 to communicate by routinely transferring data/messages between virtual storage appliance node 406 and virtual storage appliance node 410. Accordingly, in the event that at least one virtual storage appliance node does not receive a message from the other virtual storage appliance node for a defined period of time, that other virtual storage appliance node may be deemed to be offline/unavailable.

In some embodiments, communication via communication paths 530, 532, 534 may be effectuated via e.g., a CMI protocol and CMI driver (e.g., CMId), such as a Common Messaging Interface developed by Dell EMC of Hopkinton, Mass.

In some embodiments, communication paths 536, 538, 540 may be configured to allow virtual storage appliance nodes 406, 408, 410 to communicate by repeatedly providing heartbeat signals to each other to indicate their continued operation. Accordingly, in the event that at least one virtual storage appliance node does not receive a heartbeat signal from another virtual storage appliance node for a defined period of time, that other virtual storage appliance node may be deemed to be offline/unavailable.

In some embodiments, communication via communication paths 536, 538, 540 may be effectuated via e.g., an HB protocol and HB driver (e.g., net_ping), which is a heartbeat protocol developed by Dell EMC of Hopkinton, Mass.

As shown above in at least FIG. 5, virtual storage appliance nodes 406, 408, 410 may be connected using several private internal network switches (e.g., private internal network switches 506, 508, 510, 512, 514, 516, 518, 520, 522, 52, 526, 528) for routing virtual machine network interfaces to specific host network interface adapters, which may be connected using two physical switches (e.g., physical switches 544, 550). Inside the physical switches (e.g., physical switches 544, 550), virtual local area networks (VLANs) may be generated by multi-node VSA deployment process 158 to isolate pairs of network interface adapters to their own virtual networks. For example, the arrows within physical switches 544 and 550 may represent a VLAN that isolates pairs of network interface adapters to their own virtual networks.

In some embodiments, multi-node VSA deployment process 158 may connect 316 the configured plurality of virtual storage appliance nodes to one or more storage devices. For example, and in response to configuring the multi-node virtual storage system as discussed above, the multi-node virtual storage appliance system may be configured to allow virtual storage appliance nodes 406, 408, 410 to each access storage targets 104, 106, 108, 110, 112, wherein virtual storage appliance nodes 406, 408, 410 may work cooperatively (e.g., in an active-active or active-passive fashion). Accordingly, multi-node VSA deployment process 158 may connect the one or more storage devices (e.g., storage targets 104, 106, 108, 110, 112) required for an initial boot up of the virtual storage appliance nodes to the virtual storage appliance nodes (e.g., virtual storage appliance nodes 406, 408, 410).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
generating, via a computing device, a virtual storage appliance template file;
duplicating the virtual storage appliance template file to generate a plurality of virtual storage appliance node configuration files;
deploying, via a hypervisor, a plurality of virtual storage appliance nodes with the plurality of virtual storage appliance node configuration files, wherein the plurality of virtual storage appliance nodes are configured to access one or more storage devices such that each of the plurality of virtual storage appliance nodes are deployed as a separate virtual machine;
configuring each of the plurality of virtual storage appliance node configuration files for a respective virtual storage appliance node of the plurality of virtual storage appliance nodes, wherein configuring each of the plurality of virtual storage appliance node configuration files for a response virtual storage appliance node includes:
assigning a role to each virtual storage appliance node, and
configuring, via the hypervisor, one or more resources for each virtual storage appliance node based upon, at least in part, the role assigned to the virtual storage appliance node; and
validating one or more parameters of the virtual storage appliance template file, wherein validating the one or more parameters of the virtual storage appliance template file includes comparing one or more configuration parameters for the virtual storage appliance from the virtual storage appliance template file with one or more configuration parameters of a respective storage device of the one or more storage devices.

2. The computer implemented method of claim 1, wherein generating the virtual storage appliance template file includes receiving the one or more parameters of the virtual storage appliance template file, wherein the one or more parameters include at least one of:
one or more storage configuration parameters for the virtual storage appliance;
one or more network configuration parameters for the virtual storage appliance; and
one or more host configuration parameters for the virtual storage appliance.

3. The computer implemented method of claim 1, further comprising:
generating one or more network switches.

4. The computer-implemented method of claim 3, further comprising:
connecting the configured plurality of virtual storage appliance nodes to the one or more network switches.

5. The computer implemented method of claim 1, further comprising:
connecting the configured plurality of virtual storage appliance nodes to one or more storage devices.

6. The computer-implemented method of claim 1, wherein the plurality of virtual storage appliance nodes are each deployed as a separate virtual machine.

7. The computer implemented method of claim 1, wherein validating the one or more parameters of the virtual storage appliance template file includes generating a notification indicative of one or more invalid parameters when there are insufficient resources.

8. The computer implemented method of claim 1, wherein validating the one or more parameters of the virtual storage appliance template file includes generating a notification indicative of one or more invalid parameters when there are invalid configurations of resources.

9. A computer program product residing on a non-transitory computer readable medium having a plurality of instructions stored thereon which, when executed by a processor, cause the processor to perform operations comprising:
generating a virtual storage appliance template file;
duplicating the virtual storage appliance template file to generate a plurality of virtual storage appliance node configuration files;
deploying, via a hypervisor, a plurality of virtual storage appliance nodes with the plurality of virtual storage appliance node configuration files, wherein the plurality of virtual storage appliance nodes are configured to access one or more storage devices such that each of the plurality of virtual storage appliance nodes are deployed as a separate virtual machine;
configuring each of the plurality of virtual storage appliance node configuration files for a respective virtual storage appliance node of the plurality of virtual storage appliance nodes, wherein configuring each of the plurality of virtual storage appliance node configuration files for a response virtual storage appliance node includes:
assigning a role to each virtual storage appliance node, and
configuring, via the hypervisor, one or more resources for each virtual storage appliance node based upon, at least in part, the role assigned to the virtual storage appliance node; and
validating one or more parameters of the virtual storage appliance template file, wherein validating the one or more parameters of the virtual storage appliance template file includes comparing one or more configuration parameters for the virtual storage appliance from the virtual storage appliance template file with one or more configuration parameters of a respective storage device of the one or more storage devices.

10. The computer program product of claim 9, wherein generating the virtual storage appliance template file includes receiving the one or more parameters of the virtual storage appliance template file, wherein the one or more parameters include at least one of:
one or more storage configuration parameters for the virtual storage appliance;
one or more network configuration parameters for the virtual storage appliance; and
one or more host configuration parameters for the virtual storage appliance.

11. The computer program product of claim 9, further comprising instructions for:
generating one or more network switches.

12. The computer program product of claim 11, further comprising:
connecting the configured plurality of virtual storage appliance nodes to the one or more network switches.

13. The computer program product of claim 9, further comprising instructions for:
connecting the configured plurality of virtual storage appliance nodes to one or more storage devices.

14. The computer program product of claim 9, wherein the plurality of virtual storage appliance nodes are each deployed as a separate virtual machine.

15. A computing system including a processor and memory configured to perform operations comprising:
generating a virtual storage appliance template file;
duplicating the virtual storage appliance template file to generate a plurality of virtual storage appliance node configuration files;
deploying, via a hypervisor, a plurality of virtual storage appliance nodes with the plurality of virtual storage appliance node configuration files, wherein the plurality of virtual storage appliance nodes are configured to access one or more storage devices such that each of the plurality of virtual storage appliance nodes are deployed as a separate virtual machine;
configuring each of the plurality of virtual storage appliance node configuration files for a respective virtual storage appliance node of the plurality of virtual storage appliance nodes, wherein configuring each of the plurality of virtual storage appliance node configuration files for a response virtual storage appliance node includes:
assigning a role to each virtual storage appliance node, and
configuring, via the hypervisor, one or more resources for each virtual storage appliance node based upon, at least in part, the role assigned to the virtual storage appliance node; and
validating one or more parameters of the virtual storage appliance template file, wherein validating the one or more parameters of the virtual storage appliance template file includes comparing one or more configuration parameters for the virtual storage appliance from the virtual storage appliance template file with one or more configuration parameters of a respective storage device of the one or more storage devices.

16. The computing system of claim 15, wherein generating the virtual storage appliance template file includes receiving the one or more parameters of the virtual storage appliance template file, wherein the one or more parameters include at least one of:
one or more storage configuration parameters for the virtual storage appliance;
one or more network configuration parameters for the virtual storage appliance; and
one or more host configuration parameters for the virtual storage appliance.

17. The computing system of claim 15, wherein the process is further configured for:
generating one or more network switches.

18. The computing system of claim 17, wherein further comprising:
connecting the configured plurality of virtual storage appliance nodes to the one or more network switches.

19. The computing system of claim 15, wherein the processor is further configured for:
connecting the configured plurality of virtual storage appliance nodes to one or more storage devices.

* * * * *